(12) United States Patent
Brooks (10) Patent No.: US 12,384,429 B2
(45) Date of Patent: Aug. 12, 2025

(54) VEHICLE CONTROL SYSTEM AND METHOD FOR IMPLEMENTING SAFETY PROCEDURE

(71) Applicant: Transportation IP Holdings, LLC, Norwalk, CT (US)

(72) Inventor: James D. Brooks, Schenectady, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 32 days.

(21) Appl. No.: 18/418,626

(22) Filed: Jan. 22, 2024

(65) Prior Publication Data

US 2024/0182090 A1 Jun. 6, 2024

Related U.S. Application Data

(63) Continuation of application No. 16/713,861, filed on Dec. 13, 2019, now Pat. No. 11,878,725, which is a continuation of application No. 15/407,363, filed on Jan. 17, 2017, now Pat. No. 10,549,763.

(51) Int. Cl.

| | | |
|---|---|---|
| *B61C 17/12* | (2006.01) | |
| *B61C 17/00* | (2006.01) | |
| *B61L 3/12* | (2006.01) | |
| *B61L 15/00* | (2006.01) | |
| *B61L 23/06* | (2006.01) | |
| *B61L 25/02* | (2006.01) | |

(52) U.S. Cl.
CPC .............. *B61C 17/12* (2013.01); *B61C 17/00* (2013.01); *B61L 3/125* (2013.01); *B61L 15/0062* (2024.01); *B61L 23/06* (2013.01); *B61L 25/025* (2013.01); *B61L 2205/04* (2013.01)

(58) Field of Classification Search
CPC .......... B61L 23/06; B61L 27/04; B61L 27/70; B61L 3/008; B61L 3/125; B61L 2205/04; B61L 25/025; G08B 21/02; B61C 17/00; B61C 17/12; Y02T 30/00
USPC ..................................................... 246/167 A
See application file for complete search history.

(56) References Cited

U.S. PATENT DOCUMENTS

| | | |
|---|---|---|
| 4,637,668 A | 1/1987 | Kleffman et al. |
| 5,816,541 A | 10/1998 | Joyce, Jr. et al. |
| 5,978,718 A | 11/1999 | Kull |
| 5,979,718 A | 11/1999 | Jinathan |
| 7,388,483 B2 | 6/2008 | Welles et al. |
| 7,624,952 B1 | 12/2009 | Bartek |
| 8,534,553 B2 | 9/2013 | Logan et al. |
| 9,156,481 B1 | 10/2015 | Samora |

(Continued)

*Primary Examiner* — Zachary L Kuhfuss
(74) *Attorney, Agent, or Firm* — K&L Gates LLP (57) ABSTRACT

A system includes a controller, an activation device, and a communication device. The controller may control movement of a first vehicle system absent an operator input onboard the first vehicle system. The controller may control a propulsion system and a braking system of the first vehicle system. The controller may be positioned off-board the first vehicle system. The activation device may receive a status signal indicating a presence of a work marker proximate to the first vehicle system. The communication device may communicate a lockout signal from the activation device to the controller to direct the controller to prevent activation of the propulsion system and engage the braking system to prevent movement of the first vehicle system.

20 Claims, 4 Drawing Sheets

(56) References Cited

U.S. PATENT DOCUMENTS

| | | |
|---|---|---|
| 9,776,648 B2 | 10/2017 | Benjamin et al. |
| 10,106,079 B2 | 10/2018 | Denny et al. |
| 10,279,825 B2 | 5/2019 | Kim et al. |
| 10,549,763 B2 | 2/2020 | Brooks |
| 11,059,503 B2 | 7/2021 | Fisher et al. |
| 11,878,725 B2 | 1/2024 | Brooks |
| 2003/0223387 A1 | 12/2003 | Davenport et al. |
| 2007/0291985 A1 | 12/2007 | Krahnstoever et al. |
| 2008/0216701 A1 | 9/2008 | Wertz et al. |
| 2011/0006912 A1 | 1/2011 | Sheardown et al. |
| 2011/0198448 A1 | 8/2011 | Allement |
| 2013/0166114 A1 | 6/2013 | Baines et al. |
| 2014/0350767 A1* | 11/2014 | Fries .................. B61L 25/021 701/119 |
| 2015/0158513 A1 | 6/2015 | Costa et al. |
| 2015/0239482 A1 | 8/2015 | Green et al. |
| 2016/0046308 A1 | 2/2016 | Chung et al. |
| 2016/0114818 A1 | 4/2016 | Melas et al. |
| 2016/0200438 A1 | 7/2016 | Bokeno et al. |
| 2016/0280240 A1 | 9/2016 | Carlson et al. |
| 2017/0015336 A1 | 1/2017 | Bartek |
| 2017/0106888 A1 | 4/2017 | Shubs, Jr. et al. |
| 2017/0255824 A1 | 9/2017 | Miller et al. |
| 2017/0282944 A1 | 10/2017 | Carlson et al. |
| 2018/0075747 A1 | 3/2018 | Pahwa |
| 2018/0093687 A1 | 4/2018 | Bartek et al. |
| 2018/0196426 A1 | 7/2018 | Kim et al. |
| 2018/0201285 A1 | 7/2018 | Brooks |
| 2018/0244292 A1 | 8/2018 | Bailey |
| 2018/0301012 A1 | 10/2018 | Carlson |
| 2020/0114936 A1 | 4/2020 | Brooks |
| 2020/0233423 A1 | 7/2020 | Kernwein et al. |
| 2020/0255042 A1 | 8/2020 | Stokes |
| 2020/0346674 A1 | 11/2020 | Staats et al. |
| 2021/0046961 A1 | 2/2021 | Whittemore et al. |

\* cited by examiner

VEHICLE CONTROL SYSTEM AND METHOD FOR IMPLEMENTING SAFETY PROCEDURE

CROSS-REFERENCE TO RELATED APPLICATIONS

This application is a continuation of U.S. patent application Ser. No. 16/713,861, which was filed on 13 Dec. 2019, which is a continuation of U.S. Pat. No. 10,549,763, which was filed on 17 Jan. 2017, the entire disclosures of which are incorporated herein by reference.

FIELD

The subject matter described herein relates to controlling vehicle systems.

BACKGROUND

Due to the complexity of vehicle systems and harsh conditions experienced by vehicle systems, the vehicle systems may be periodically inspected, maintained, and repaired to ensure that the vehicle system is in proper working order and to reduce the likelihood of breaking down during a trip. A recognized safety concern is injury to a first operator (e.g., inspector, mechanic, lineman, engineer, etc.) caused by a second operator controlling the vehicle system to move while the first operator is performing inspections, maintenance, or repairs on the vehicle system. In order to reduce the risk of moving a vehicle system while a worker is in a vulnerable position relative to the vehicle system, there is a safety procedure in the railroad industry known as Blue Flag. The Blue Flag safety procedure has been implemented by railroad companies by requiring all personnel working on or near a vehicle system to place a visual indicator, such as a blue flag, an identification card, or the like that is specific to each person in a designated location, such as in a cab of a locomotive. The Blue Flag safety procedure mandates that the vehicle system is not permitted to be moved until all of the blue flags or other objects have been removed by the corresponding personnel, indicating that all of the personnel are in a safe position relative to the vehicle system.

As the capabilities of control systems and communication systems advance, there may be a desire to remotely control the movement of vehicle systems along routes. For example, a remote operator of a vehicle system may be miles away from the vehicle system such that the vehicle system is not in the line of sight of the remote operator. The remote operator is not able to see a visual indicator representing an active safety procedure, such as the Blue Flag safety procedure. The remote operator may be unaware of an active safety procedure associated with or proximate to the vehicle system. There is a concern that the remote operator may attempt to move the vehicle system in an unintentional violation of the safety procedure that risks harm to operators on or near the vehicle system.

BRIEF DESCRIPTION

In an embodiment, a system (e.g., for implementing a safety procedure) is provided that includes a safety mode activation device disposed onboard a vehicle system and operatively connected to a controller of the vehicle system. The safety mode activation device is configured to receive a status signal indicating a presence of one or more of an operator or an active work marker in a location proximate to the vehicle system. The safety mode activation device is further configured to transmit a lockout signal to the controller to prevent movement of the vehicle system along a route responsive to receiving the status signal.

Optionally, the transmission of the lockout signal prevents the movement of the vehicle system by not implementing control signals that include operational settings for controlling one or more of tractive efforts and braking efforts of the vehicle system. The control signals may be received from one or more of an operator input device onboard the vehicle system or a remote control system disposed off-board the vehicle system. Optionally, the safety mode activation device receives the status signal from a mobile device carried by the operator. The safety mode activation device may receive the status signal from the mobile device responsive to the mobile device determining that the mobile device is located within a designated proximity distance of the vehicle system. Alternatively, the safety mode activation device may be configured to determine a location of the operator based on the status signal received from the mobile device carried by the operator, and the safety mode activation device may transmit the lockout signal to the controller responsive to determining that the location of the operator is within a designated proximity distance of the vehicle system. Optionally, the safety mode activation device receives the status signal from a detection sensor mounted on the vehicle system and transmits the lockout signal to the controller responsive to determining that the one or more of the operator or the active work marker is located within a detection proximity threshold of the detection sensor. Optionally, the safety mode activation device receives the status signal from an operator input device in response to an operator using the operator input device to selectively initiate transmission of the status signal by providing a personal identifier to the operator input device.

In another embodiment, a method (e.g., for implementing a safety procedure) is provided that includes receiving, by a safety mode activation device onboard a vehicle system and operatively connected to a controller of the vehicle system, a status signal that indicates a presence of at least one of an operator or an active work marker in a location proximate to the vehicle system. The method also includes transmitting a lockout signal to the controller to automatically prevent movement of the vehicle system along a route responsive to receiving the status signal.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein relate to systems and methods that enable implementation of safety procedures on vehicle systems able to be controlled remotely by remote control systems. The systems and methods provide a safety mode on a vehicle system that guarantees the safety of personnel working on or around the vehicle system by ensuring that the vehicle system does not move while in the safety mode. The systems and methods are configured to automatically detect an operator and/or an active work marker in a location proximate to the vehicle system, and the safety mode is triggered responsive to detecting the operator and/or the active work marker proximate to the vehicle system. The systems and methods described herein are also configured to allow operators to selectively initiate the safety mode of the vehicle system using an operator input device, which may or may not be on the vehicle system. For example, the operator input device may be a mobile device carried by an operator proximate to the vehicle system, an onboard input device utilized by an operator on the vehicle system (e.g., in a cab of a locomotive), or a remote input device utilized by an operator located at a remote control system. Any operator with certain job-related qualifications may be allowed to initiate the safety mode of the vehicle system using a corresponding operator input device, such as by selecting a button and providing a personal identifier. The operator initiating the safety mode is not required to be physically present at the vehicle system to deposit an object (such as a blue flag), swipe an identification card, or the like.

In the systems and methods described herein, the activation of the safety mode prevents the vehicle system from moving. For example, the activation of the safety mode may cause automatic engagement of a brake of the vehicle system and may disregard implementation of any received control signals instructing the vehicle system to move. Furthermore, the activation of the safety mode may also prevent an engine of the vehicle system from starting, prevent the engine from increasing a speed of the engine, prevent a power bus on the vehicle system from powering up, or the like. The systems and methods may ensure that control signals instructing the vehicle system to move are not implemented while the vehicle system is in the safety mode by mechanically and/or electrically isolating or disconnecting a propulsion subsystem of the vehicle system from a vehicle controller that conveys control signals to the propulsion subsystem.

The systems and methods described herein may notify workers proximate to the vehicle system that the vehicle system is in the safety mode by providing a designated visual and/or audible representation of the safety mode. The designated visual and/or audible representation may include generating a lighting effect of a specific color or pattern, such as shining a blue light, generating a specific sound effect, and/or the like. The operator at the remote control system may also be notified that the vehicle system is in the safety mode by a designated visual and/or audible representation of the safety mode, such as providing a blue operating screen on a display device visible to the operator and/or a text-based message on the display device. The safety mode may be deactivated to allow for controlled movement of the vehicle system along a route. Systems and methods described herein may allow for deactivating the safety mode of the vehicle system in response to determining that no operators and/or active work markers are located proximate to the vehicle system.

The inventive subject matter described herein may be used in connection with rail vehicles that move along rails. However, the inventive subject matter may also be used in connection with other types of vehicles, such as automobiles, trucks, mining vehicles, other off-highway vehicles (e.g., vehicles that are not designed or are not legally permitted for travel on public roadways), aerial vehicles (e.g., fixed wing aircraft, drones or other unmanned aircraft, etc.), or marine vessels.

The vehicle systems described herein can include only a single vehicle or, alternatively, multiple vehicles operatively coupled to travel together along a route. For example, the multiple vehicles in the vehicle system may be mechanically coupled with each other. In another example, the multiple vehicles in the vehicle system are not mechanically coupled with each other, but have coordinated movements to travel together along the route. For example, two or more vehicles may wirelessly communicate with each other to coordinate the movements of the vehicles.

Figure 1:
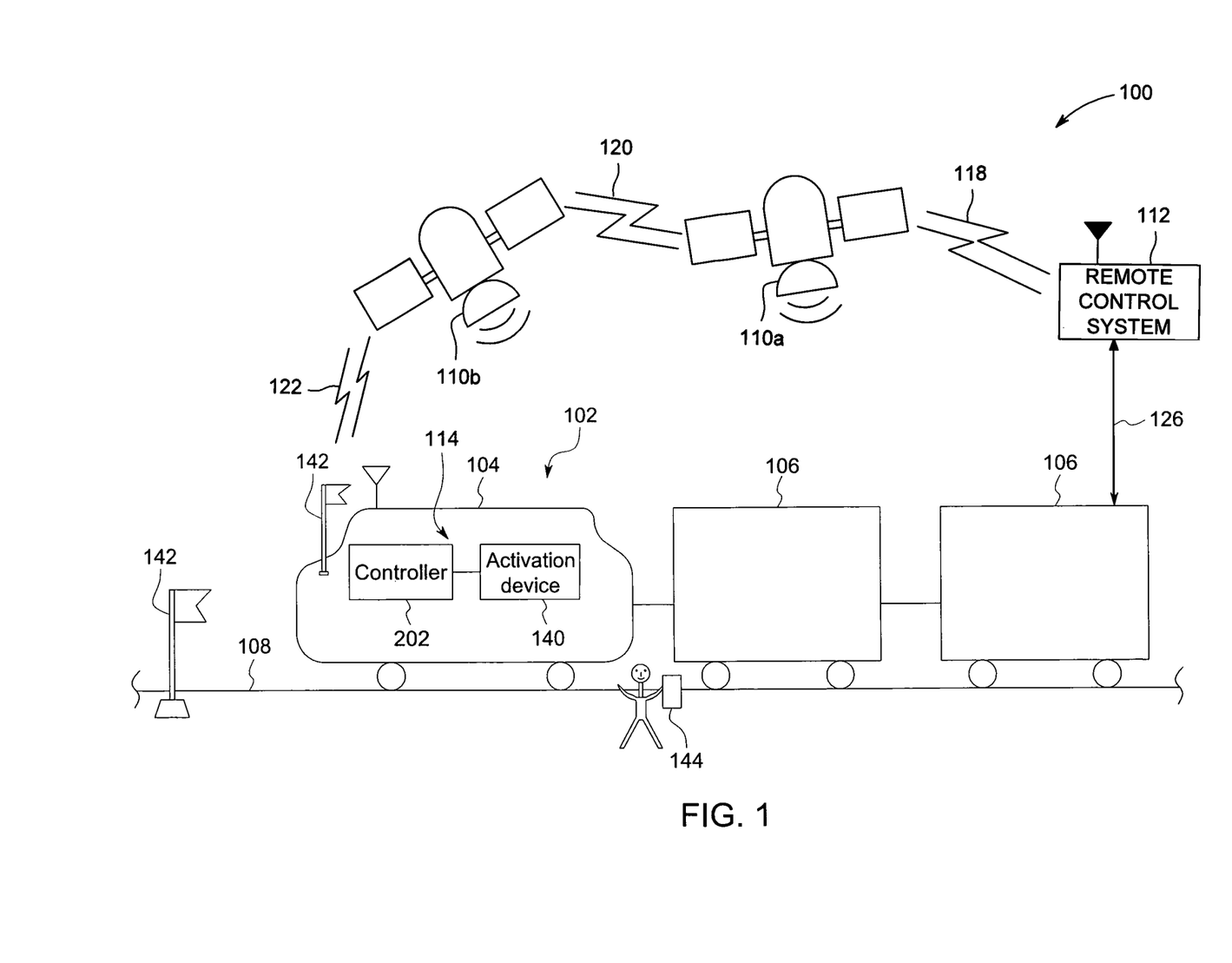
FIG. 1 illustrates one embodiment of a communication system used to activate a safety mode of a vehicle system to prevent movement of the vehicle system along a route.

FIG. 1 illustrates one embodiment of a communication system 100 used to activate a safety mode of a vehicle system 102 to prevent movement of the vehicle system along a route 108. The vehicle system 102 in the illustrated embodiment includes a propulsion-generating vehicle 104 and two non-propulsion-generating vehicles 106. The propulsion-generating vehicle 104 generates tractive effort for propelling the vehicle system 102 along the route 108. The non-propulsion-generating vehicles 106 may include brakes but do not include propulsion systems to generate tractive effort. The non-propulsion-generating vehicles 106 may be used for carrying passengers and/or cargo. The vehicles 104, 106 are mechanically coupled with each other in the illustrated embodiment, but may not be mechanically coupled in an alternative embodiment. Although the vehicle system 102 includes one propulsion-generating vehicle 104 and two non-propulsion-generating vehicles 106 in FIG. 1, the vehicle system 102 may include more than one propulsion-generating vehicle 104 and/or more or less than two non-propulsion-generating vehicles 106 in other embodiments. In one alternative embodiment, the vehicle system 102 includes a single propulsion-generating vehicle 104 and has no non-propulsion-generating vehicles 106. In the illustrated embodiment, the propulsion-generating vehicle 104 is disposed at one end of the vehicle system 102, but the arrangement of the propulsion-generating vehicle 104 and the non-propulsion-generating vehicles 106 may also be different in other embodiments, such that by locating the propulsion-generating vehicle 104 at the other end of the vehicle system 102 or between the two non-propulsion-generating vehicles 106. The vehicle system 102 is shown in FIG. 1 as a railway train, such that the propulsion-generating vehicle 104 is a locomotive and the non-propulsion-generating vehicles 106 are rail cars. But, the vehicle system 102 can represent other types of vehicles, such as passenger automobiles, tractor trailers, and marine vessels in other embodiments.

The vehicle system 102 includes an onboard vehicle control system 114. The vehicle control system 114 is disposed on the propulsion-generating vehicle 104 in the illustrated embodiment, but alternatively may be disposed on one of the non-propulsion-generating vehicles 106 or distributed among multiple vehicles 104, 106 of the vehicle system 102. The vehicle control system 114 includes at least a vehicle controller 202 and a safety mode activation device 140. The vehicle controller 202 (also referred to herein as controller 202) includes one or more processors (e.g., one or more microprocessors, field programmable gate arrays, and/ or integrated circuits) that include and/or are connected with hardware circuits or circuitry. The vehicle control system 114 can control movement of the vehicle system 102. For example, the controller 202 may convey control signals to propulsion-generating components and braking components of the propulsion-generating vehicle 104 to control the movement of the vehicle system 102 along the route 108. The safety mode activation device 140 also includes one or more processors (e.g., one or more microprocessors, field programmable gate arrays, and/or integrated circuits) that include and/or are connected with hardware circuits or circuitry. The safety mode activation device 140 is configured to activate a safety mode of the vehicle system 102 to prevent movement of the vehicle system 102 along the route 108 when the vehicle system 102 is in the safety mode, as described in more detail herein.

The communication system 100 also includes a remote control system 112 that is located off-board the vehicle system 102. The remote control system 112 is configured to remotely control movement of the vehicle system 102 along the route 108 by transmitting control signals to the vehicle control system 114 onboard the vehicle system 102. One or more operators may be located at the remote control system 112, and may manually manipulate the remote control system 112 to select the control signals that are transmitted to the vehicle system 102. The control signals may include operational settings such as throttle settings, brake settings, speed settings, or the like. Upon receiving the control signals, the controller 202 may be configured to implement the operational settings to control the movement of the vehicle system 102 according to the remote control signals. However, if the vehicle system 102 is in the safety mode, the operational settings are not implemented such that the vehicle system 102 does not move according to the control signals. The remote control system 112 may also transmit status signals to the safety mode activation device 140 which are used by the safety mode activation device 140 to activate (and subsequently) deactivate the safety mode.

The remote control system 112 is separated from the vehicle system 102 by a distance 126. The distance 126 may be 0.5 kilometers (km), 5 km, 50 km, 500 km, 5000 km, or the like. The distance 126 between the vehicle system 102 and the remote control system 112 may be beyond or outside of a line of site of an operator that is located at the remote control system 112, such that the operator cannot see the vehicle system 102 from the remote control system 112 relying on eyesight alone without the use of cameras or other machine vision. The distance 126 may extend between different time zones and/or different delineated geographical areas (e.g., different towns, counties, states, countries) or the like. For example, an operator located at the remote control system 112 in New York may be able to control the movement of the vehicle system 102 when the vehicle system 102 is located in Utah. In an alternative embodiment, the distance 126 to the vehicle system 102 may be within the line of site of an operator at the remote control system 112.

In an embodiment, the remote control system 112 is configured to communicate with the vehicle control system 114 on the vehicle system 102 via one or more long range wireless signals. For example, the remote control system 112 may be communicatively linked with the vehicle control system 114 using one or more satellites 110. In the illustrated embodiment, the remote control system 112 transmits the control signals and status signals (for activating and deactivating the safety mode) as long range wireless signals to a first satellite 110A by a first communication link 118 between the remote control system 112 and the first satellite 110A. The first satellite 110A transmits the status signals to a second satellite 110B by a second communication link 120 between the two satellites 110A, 110B. The second satellite 110B transmits the status signals to the vehicle control system 114 onboard the vehicle system 102 by a third communication link 122 between the second satellite 110B and the vehicle system 102. The satellites 110A, 110B and communication links 118, 120, 122 may also be used to transmit long range wireless signals in the reverse direction from the vehicle control system 114 to the remote control system 112. In other embodiments, more or less than two satellites may be used to communicate long range wireless signals between the remote control system 112 and the vehicle control system 114.

Since the vehicle system 102 is able to be controlled remotely by an operator at the remote control system 112, the vehicle system 102 optionally may not have any operator present on the vehicle system 102 as the vehicle system 102 moves along the route 108. Therefore, there may be no operator onboard the vehicle system 102 to activate or initiate the safety mode of the vehicle system 102 to prevent the vehicle system 102 from moving in response to another operator moving proximate to the vehicle system 102 to perform work on the vehicle system 102, on the route 108, and/or on another vehicle system nearby. Furthermore, since the vehicle system 102 is controlled remotely, the remote operator may not be able detect the presence of any operators or visual indicia (e.g., colored flags) on or around the vehicle system 102 that would indicate to the remote operator that the vehicle system 102 should be placed in the safety mode to prevent movement of the vehicle system 102.

In various embodiments described herein, the safety mode activation device 140 (also referred to herein as activation device 140) is configured to receive a status signal from one or more sensors, operator input devices, or other input devices. the safety mode activation device 140 may analyze the status signal or signals received. If the status signal indicates the presence of an operator (other than an operator in a cab of the vehicle 104) or an active work marker 142 within a certain designated proximity of the vehicle system 102, the safety mode activation device 140 is configured to communicate a lockout signal to the controller 202 to initiate the safety mode. For example, the safety mode activation device 140 may determine, based on a received status signal, that an operator or another person (e.g., a trespasser) is under one of the vehicles 104, 106 or on one of the vehicles 104, 106. The active work marker 142 is a visual indicator that represents the presence of operators in the area performing work, such as inspection, maintenance, or repair on the vehicle system 102, the route 108, and/or another vehicle system nearby. In the illustrated embodiment, two active work markers 142 are shown in the form of flags (e.g., blue flags), but the active work markers 142 may have other shapes and/or indicia in other embodiments. Although one active work marker 142 is mounted on the propulsion-generating vehicle 104 in the illustrated embodiment, it is understood that an active work marker may also or alternatively be mounted to a non-propulsion vehicle 106.

The activation device 140 may be configured to transmit the lockout signal automatically upon receipt of a status signal from an operator input device or a sensor that indicates the current or anticipated presence of an operator within a designated proximity of the vehicle system 102. The sensor may be a camera, a proximity sensor, a motion sensor, an audio sensor, a radio frequency identification (RFID) sensor, or the like. For example, the activation device 140 may transmit the lockout signal based on a status signal from a sensor that indicates detection of an operator or an active work marker 142 within a designated proximity distance (such as three meters or the like) of the vehicle system 102. Furthermore, the safety mode activation device 140 may transmit the lockout signal based on a status signal received from an operator input device, which may be user-initiated or autonomously transmitted to the activation device 140. For example, an operator proximate to the vehicle system 102 may use a mobile device 144 or an onboard input device on the vehicle 104 to selectively transmit, via a user interface on the device, a status signal to the safety mode activation device 140 that commands the activation device 140 to transmit the lockout signal, initiating the safety mode. The mobile device 144 may be a mobile phone, a tablet computer, a personal digital assistant (PDA), a handheld personal computer, a walkie talkie, or another mobile communication device. For example, one operator tasked with performing scheduled maintenance on the propulsion-generating vehicle 104 may use that operator's mobile device 144 to transmit the lockout signal to the vehicle system 102 prior to starting the scheduled maintenance. An operator located remote from the vehicle system 102 at the remote control system 112 can also selectively transmit a status signal to the safety mode activation device 140 commanding initiation of the safety mode. The status signal sent from the remote control system 112 may be transmitted as a long range wireless signal using the communication links 118, 120, 122. Therefore, the activation device 140 may activate the safety mode based on detection of a triggering condition (such as a person or work marker on or near the vehicle system 102) and/or reception of a command selectively transmitted by an operator using an input device.

In response to the safety mode activation device 140 receiving a status signal indicating the presence (or anticipated presence) of an operator or an active work marker 142 in a location proximate to the vehicle system 102, the safety mode activation device 140 is configured to transmit a lockout signal to the controller 202 to activate the safety mode. In response to receiving the lockout signal, the controller 202 is configured to prevent movement of the vehicle system 102 along the route 108 according to a designated safety procedure or protocol associated with the safety mode. In the safety mode, the vehicle system 102 is prevented from moving to prevent injuries caused by the vehicle system 102 moving while one or more operators or other persons are in a vulnerable location relative to the vehicle system 102, such as on the route 108, on the vehicle system 102, or under the vehicle system 102. Although the vehicle system 102 may be controlled remotely by the remote control system 112 when not in the safety mode, the vehicle system 102 is not controlled by the remote control system 112 when the vehicle system 102 when in the safety mode. For example, the controller 202 may automatically initiate one or more default actions, such as engaging a brake of the vehicle system, preventing the disengagement of the brake, preventing an engine of the vehicle system from starting, preventing a currently-operating engine from increasing its speed (e.g., revolutions per minute (RPMs)), preventing a power bus of the vehicle system from energizing, preventing implementation of any control signals received while in the safety mode, providing an audio and/or visual notification that the vehicle system 102 is in the safety mode, or the like. For example, since the vehicle system 102 is not controlled remotely when the vehicle system 102 is in the safety mode, the controller 202 may disregard or at least delay implementation of any control signals received from the remote control system 112 while the vehicle system 102 is in the safety mode. The power bus may be associated with the propulsion subsystem, such that the power bus may be energized prior to supplying power for releasing an air brake, for generating a tractive effort, or the like.

Figure 2:
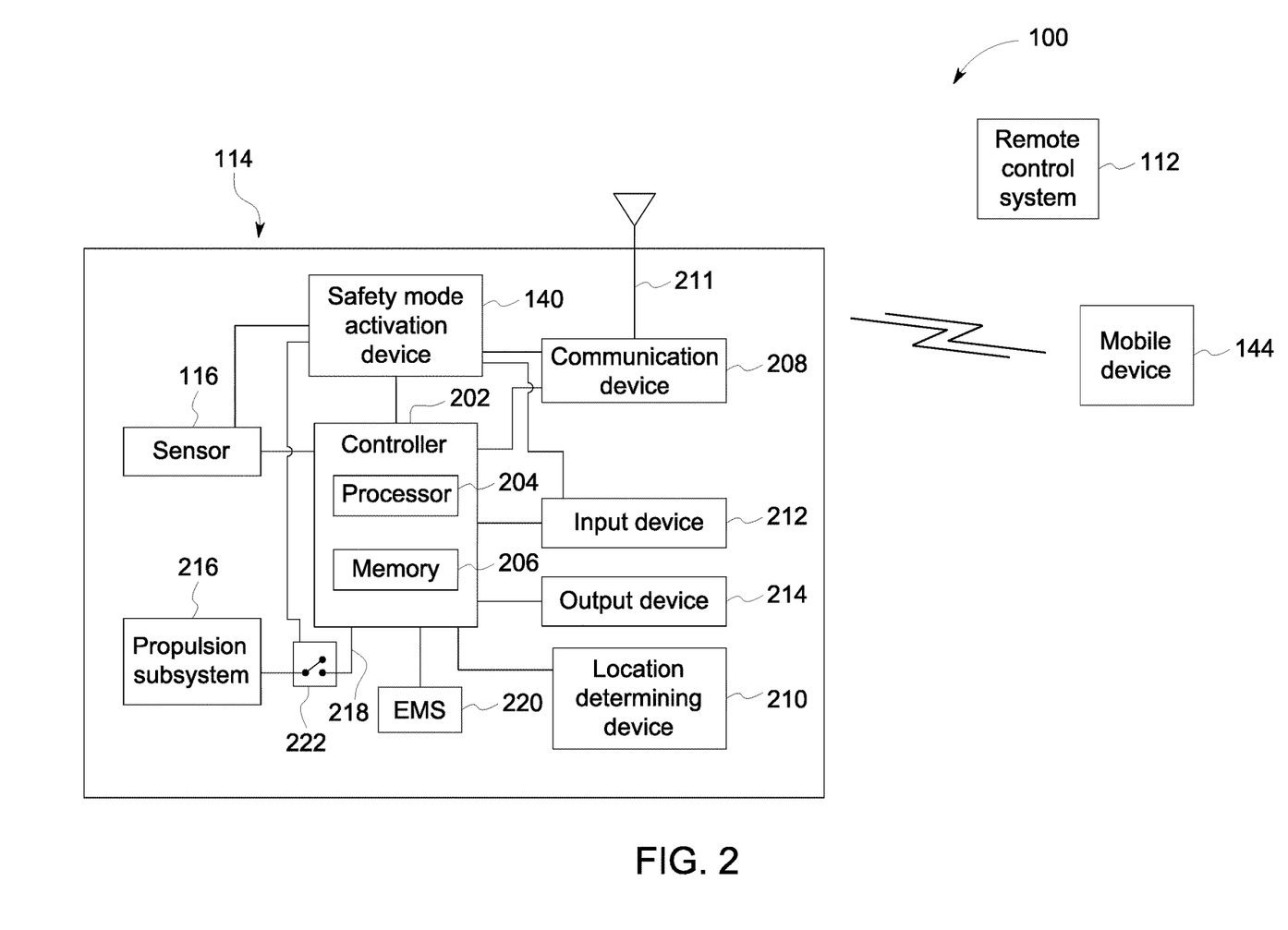
FIG. 2 is a schematic diagram of the communication system showing the vehicle control system, the remote control system, and the mobile device in accordance with an embodiment.

FIG. 2 is a schematic diagram of the communication system 100 showing the vehicle control system 114, the remote control system 112, and a mobile device 144 in accordance with an embodiment. All of the components of the vehicle control system 114 shown in FIG. 2 may be disposed on the same vehicle of the vehicle system 102, such as the propulsion-generating vehicle 104, or alternatively may be distributed among two or more of the vehicles 104, 106.

The vehicle control system 114 includes the controller 202, the safety mode activation device 140, and various other components that operate to perform one or more functions described herein. For example, the controller 202 includes one or more processors 204 that perform operations based on instructions stored on a tangible and non-transitory computer readable storage medium or memory 206. The controller 202 may additionally or alternatively include one or more hard-wired devices that perform operations based on hard-wired logic of the devices. The controller 202 may represent the hardware that operates based on software or hardwired instructions, the software that directs hardware to perform the operations, or a combination thereof. The memory 206 electrically and/or magnetically stores data, and may represent or include a computer hard drive, random access memory, read-only memory, dynamic random access memory, an optical drive, or the like.

The controller 202 is operatively or communicatively connected with the safety mode activation device 140 via a wired or wireless connection. The activation device 140 also includes one or more processors (not shown) that perform operations based on instructions stored on a tangible and non-transitory computer readable storage medium or memory (not shown). The activation device 140 may additionally or alternatively include one or more hard-wired devices that perform operations based on hard-wired logic of the devices. The activation device 140 may represent the hardware that operates based on software or hardwired instructions, the software that directs hardware to perform the operations, or a combination thereof. The activation device 140 operates according to one or more safety mode protocols stored on the memory. The activation device 140 uses the safety mode protocols to analyze the status signals received to determine if and when a lockout signal should be transmitted to the controller 202. The activation device 140 also uses the safety mode protocols to determine the content of the lockout signal, and any supplemental actions to take after transmitting the lockout signal, such as controlling lights on the vehicle system 102 to provide a designated lighting effect, activating an electrical switch to electrically disconnect the controller 202 from the propulsion subsystem 216 (or a component thereof), or the like. Furthermore, the activation device 140 uses the safety mode protocols to determine when to transmit a release signal to the controller 202, turning off the safety mode and allowing controlled movement of the vehicle system 102 along the route 108. Although the safety mode activation device 140 is shown as a separate device from the controller 202, in an alternative embodiment the safety mode activation device 140 may be incorporated into the controller 202, such as representing at least one processor of the processors 204.

The vehicle control system 114 further includes a communication device 208 operatively connected to the controller 202 and the safety mode activation device 140 via wired or wireless connections. The communication device 208 can communicate with an off-board location, such as the remote control system 112, the mobile device 144 carried by an operator, another vehicle system, a dispatch facility, another vehicle in the same vehicle system 102, a wayside device (e.g., transponder), or the like. The communication device 208 communicates with the off-board locations via wireless connections (e.g., via radio frequency). For example, the communication device 208 may include a wireless antenna 211 and associated circuitry and software to communicate wirelessly, such as a transceiver, a separate receiver and transmitter, or the like. Optionally, the communication device 208 may be connected with a wired connection via a cable to another vehicle in the vehicle system 102. For example, the cable may be a trainline, a multiple unit cable, an electronically-controlled pneumatic brake line, or the like. The communication device 208 can be used to receive a variety of information described herein, such as control signals received from the remote control system 112, status signals received from the mobile device 144, the remote control system 112, an onboard input device 212, and sensors 116. The communication device 208 may also transmit information remotely, such as location data obtained by a location determining device 210 onboard the vehicle system 102, mode status information indicating whether or not the vehicle system 102 is in the safety mode, movement information (e.g., speed, power output, fuel efficiency, fuel remaining, etc.) and the like to the remote control system 112 and/or the mobile device 144.

The location determining device 210 determines a location of the vehicle system 102 along the route 108. The location determining device 210 may determine the location of the vehicle system 102 as a geographic location, an absolute location (e.g., using geographic coordinates), or a relative location (e.g., relative to a reference location or object). The location determining device 210 may be a Global Positioning System receiver that obtains location data representative of the location of the vehicle system 102. The controller 202 and the safety mode activation device 140 are configured to analyze the location data to determine the location of the vehicle system 102.

The controller 202 is operatively connected with an input device 212 and an output device 214. The input and output devices 212, 214 may be disposed within a cab of one of the vehicles 104, 106 of the vehicle system 102. The input device 212 receives manual inputs from an operator, and may include one or more keyboards, throttles, switches, buttons, pedals, microphones, touchscreens, and/or the like. The output device 214 provides information to the operator onboard the vehicle system 102, and may include one or more audio emitters (e.g., speakers), displays, lights, and/or the like. Although shown as two separate devices, at least some components of the input device 212 may be integrated with at least some components of the output device 212, 214, such as a display with an integrated touchscreen for receiving user touch inputs. As described above, the input device 212 may be used by an operator onboard the vehicle system 102 to command the safety mode activation device 140 to initiate the safety mode. The input device 212 may be used in a similar way as the mobile device 144 and the remote control system 112 to selectively transmit a status signal commanding implantation of the safety mode via an operator input on a user interface of the input device 212. The input device 212 is integrally connected to the vehicle system 102 and may be located within the cab of the propulsion-generating vehicle 104. When the vehicle system 102 is in the safety mode, the safety mode activation device 140 (and/or the controller 202) may control the output device 214 to display and/or generate a safety mode notification representing that the vehicle system 102 is in the safety mode. The safety mode notification may be a lighting effect using one or more lights, a sound effect using one or more audio emitters, a graphical display effect using one or more displays of the output device 214, and/or the like. For example, the activation device 140 may control various lights of the vehicle system 102 may emit a designated lighting effect, such as a blue light, when the vehicle system is in the safety mode. The designated lighting effect is understood by personnel to represent that the vehicle system 102 is in the safety mode.

The controller 202 is operatively connected with the propulsion subsystem 216 of the propulsion-generating vehicle 104 of the vehicle system 102. The propulsion subsystem 216 provides tractive efforts and/or braking efforts for the propulsion-generating vehicle 104. The propulsion subsystem 216 may include or represent one or more engines, motors, alternators, generators, brakes, batteries, turbines, and associated components, that operate to both propel and slow the vehicle system 102 along the route 108. The propulsion subsystem 216 is controlled by the controller 202. The controller 202 transmits control signals to the propulsion subsystem 216 along an electrically conductive circuit 218, which may include one or more wires, cables, or the like. The electrically conductive circuit 218 allows the controller 202 to control the components of the propulsion subsystem 216 individually, such as by transmitting a first signal to an engine and a second signal to a brake. The control signals transmitted to the propulsion subsystem 216 may be prompted by an operator utilizing the input device 212 or the remote control system 112 to control the movement of the vehicle system 102. For example, when the vehicle system 102 is controlled locally by an operator onboard the vehicle system 102, the controller 202 may receive onboard control signals from the operator input device 212. The controller 202 then conveys the onboard control signals (or other signals based on the received onboard control signals) to the propulsion subsystem 216. When the vehicle system 102 is controlled remotely by an operator at the remote control system 112, the controller 202 receives the remote control signals via the communication device 208 and conveys the remote control signals (or other signals based on the received remote control signals) to the propulsion subsystem 216. The controller 202 may also be configured to transmit some control signals to the propulsion subsystem 216 autonomously (e.g., without operator consent) based on operational settings of a designated trip plan and/or settings of the safety mode. For example, in response to receiving the lockout signal from the safety mode activation device 140, the controller 202 may automatically transmit control signals to the propulsion subsystem 216 activating or instructing engagement of the brakes of the vehicle system 102 to prevent movement of the vehicle system 102.

In one embodiment, the vehicle control system 114 includes an electrical switch 222 disposed along the electrically conductive circuit 218 between the controller 202 and the propulsion subsystem 216. The safety mode activation device 140 is configured to control the switch 222 to electrically connect and disconnect the controller 202 from the propulsion subsystem 216. Although the switch 222 is broadly shown as located between the controller 202 and the propulsion subsystem 216, in one or more embodiments, the switch 222 may be disposed between the controller 202 and a specific subset of one or more components of the propulsion subsystem 216, such as traction motors. The switch 222 is controllable between a closed state and an open state. In the closed state, the electrically conductive circuit 218 between the controller 202 and the propulsion subsystem 216 is closed, such that electrical current representing the control signals transmitted from the controller 202 is allowed to flow along the circuit 218 to the propulsion subsystem 216. Conversely, when the switch 222 is in the open state, the electrically conductive circuit 218 is open or disconnected such that the current representing the control signals transmitted from the controller 202 does not flow along the circuit 218 to the propulsion subsystem 216. Therefore, when the switch 222 is activated in the open state, control signals received at the controller 202 from the remote control system 212, the onboard operator input device 212, and/or a trip plan from an energy management system 220 are not a implemented because the control signals are not received by the propulsion subsystem 216. The safety mode activation device 140 controls the state of the switch 222 by transmitting a switch signal, such as a designated current, voltage, or the like, which activates the switch 222 to close or open depending on the characteristics of the switch signal. The switch 222 may be any electrical switch, such as a contactor, a transistor, a MOSFET, a relay, or the like.

In an embodiment, in response to receiving a status signal that indicates the presence of an operator and/or an active work marker within a proximity distance of the vehicle system 102, the safety mode activation device 140 is configured to automatically activate the switch 222 to cause the switch 222 to transition from the closed state to the open state to prevent the propulsion subsystem 216 from receiving any control signals from the controller 202 while the vehicle system 102 is in the safety mode. The safety mode activation device 140 may activate the switch 222 concurrently with transmitting the lockout signal to the controller 202 or after transmitting the lockout signal to the controller 202. For example, in one embodiment, the activation device 140 transmits the lockout signal to the controller 202, which causes the controller 202 to automatically engage the brake of the vehicle system 102. The activation device 140 activates the switch 222 after the brake is engaged to thereafter prevent the controller 202 from causing disengagement of the brake while in the safety mode. In another embodiment, the activation of the switch 222 does not prohibit the controller 202 from causing the brake to engage, so the activation device 140 may transmit the lockout signal to the controller 202 concurrently with activating the switch 222. In an embodiment, when the safety mode activation device 140 receives a status signal indicating an absence of an operator and an active work marker proximate to the vehicle system 102, the safety mode activation device 140 is configured to transmit a release signal to the controller 202 and also deactivate the switch 222, closing the switch 222 to reestablish the closed circuit path between the controller 202 and the propulsion subsystem 216. The activation device 140 may deactivate the switch 222 by sending a deactivation signal to the switch 222 or ceasing transmission of an activation signal to the switch 222.

The vehicle control system 114 optionally includes an energy management system 220 communicatively coupled with the controller 202. The energy management system 220 can create and/or obtain a trip plan, which designates operational settings of the vehicle system 102 (e.g., throttle settings, power outputs, speed, braking efforts, and the like) as a function of at least one of location, time elapsed, or distance traveled during a trip along the route 108. A trip plan can differ from a schedule in that the schedule may direct the vehicle system 102 where to be located and at what times the vehicle system 102 is to be at the locations of the schedule. The trip plan, however, may designate the operational settings in order to control the vehicle system 102 within external constraints while achieving one or more goals, such as traveling according to a schedule, reducing fuel consumption, and/or reducing total travel time to complete a trip. The external constraints may be limits on the amount of fuel consumed, the amount of emissions generated, speed limits, noise limits, and the like. For example, the vehicle system 102 traveling along the route 108 from a starting location to a finishing location within a designated time according to a trip plan may consume less fuel or produce fewer emissions than the same vehicle system 102 traveling along the same route 108 from the same starting location to the same finishing location within the same designated time, but according to another trip plan or according to manual control of the vehicle system 102. Various examples of trip plans (also referred to as mission plans or trip profiles) and how the trip plans are determined are provided in U.S. patent application Ser. No. 11/385,354, the entire disclosure of which is incorporated herein by reference.

The energy management system 220 can include hardware circuits or circuitry that include and/or are connected with one or more processors. The energy management system 220 may create a trip plan, retrieve a trip plan from a memory of the energy management system 220 or the memory 206 of the controller 202, and/or receive the trip plan from an off-board location via the communication device 208. The controller 202 (e.g., the one or more processors 204 thereof) can refer to the trip plan in order to determine the designated operational settings to be implemented by the propulsion-generating vehicle 104 of the vehicle system 102 at specific locations along the route 108.

The vehicle control system 114 further includes one or more detection sensors 116 mounted along an exterior and/or an interior of the vehicle system 102 and operatively connected to the safety mode activation device 140 via wired or wireless connections. The detection sensors 116 can obtain sensor data that is indicative of an area proximate to the vehicle system 102, such as the area in the vicinity of the vehicle system 102. For example, the detection sensor 116 may obtain sensor data in an area in front of the vehicle system 102 in a direction of travel of the vehicle system 102, in an area behind the vehicle system 102 in the direction of travel, in an area along the sides of the vehicle system 102, in an area underneath the vehicle system 102, and/or the like. The detection sensors 116 may include a camera that obtains still and/or motion image data of the area proximate to vehicle system 102. For example, the detection sensor 116 may be one or more cameras that capture still images or video in the front and the rear of the vehicle system 102. Optionally, the detection sensors 116 may include a radar system that sends and receives pulses reflected off of an object in order to detect a presence of an object in an area proximate to the vehicle system 102. Optionally, the detection sensors 116 may include a radio frequency identification (RFID) reader that uses electromagnetic fields to automatically identify RFID tags located within a designated proximity distance of the RFID reader. Optionally, the detection sensors 116 may include a different proximity sensor that uses electromagnetic fields and/or radiation (e.g., infrared radiation) to detect the presence of an object in the area proximate to the vehicle system 102. The detection sensors 116 alternatively or additionally may include motion sensors, audio sensors, or the like. The detection sensors 116 may obtain sensor data (e.g., image, statistical, radar, RFID, or the like) within a distance of 2 meters, 3 meters, 5 meters, 10 meters, or the like from the vehicle system 102. The number, types, and placement of the detection sensors 116 on the vehicle system 102 may vary.

The detection sensors 116 may transmit the sensor data as status signals to the safety mode activation device 140. The activation device 140 is configured to analyze the sensor data in the status signals to determine whether the sensor data indicates the presence of any persons or active work markers within the designated vicinity of the vehicle system 102. The activation device 140 transmits the lockout signal to the controller 202 to initiate the safety mode in response to confirming the presence of a person or an active work marker within the designated vicinity of the vehicle system 102 based on the status signals received from one or more of the detection sensors 116.

Figure 3:
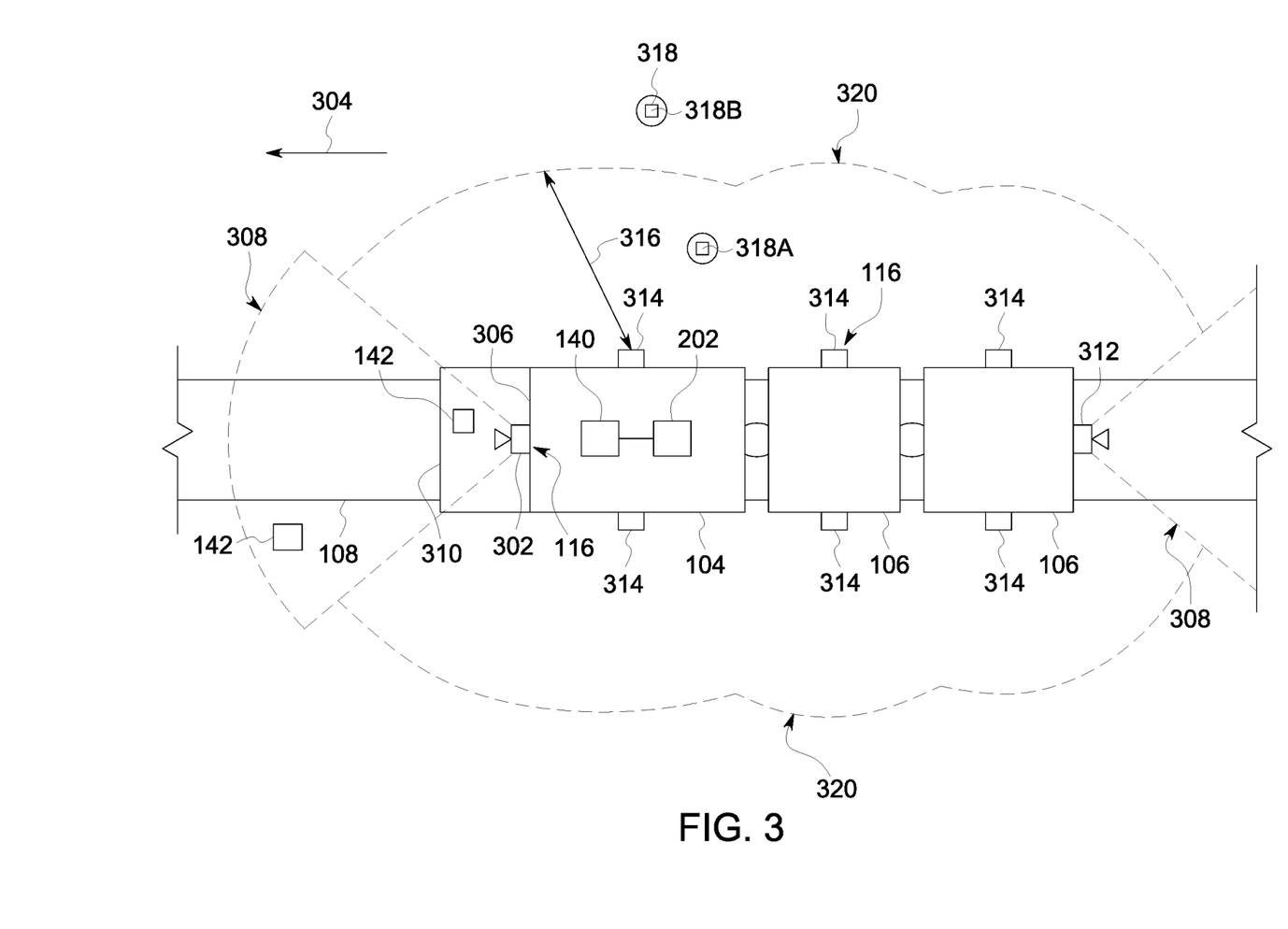
FIG. 3 illustrates a top-down view of the vehicle system on the route according to an embodiment.

FIG. 3 illustrates a top-down view of the vehicle system 102 on the route 108 according to an embodiment. The vehicle system 102 includes multiple detection sensors 116 mounted to the vehicle system 102 for detecting (e.g., optically, electromagnetically, and/or acoustically) the presence of operators and/or active work markers 142 in a location proximate to the vehicle system 102. In the illustrated embodiment, the vehicle system 102 includes a first camera 302 mounted to the propulsion-generating vehicle 104 and facing frontward along a direction of travel 304 of the vehicle system 102. The first camera 302 may be mounted on a cab 306 of the vehicle 104 and oriented to have a field of view 308 that includes a front end 310 of the vehicle 104 and an area of the route 108 in front of the vehicle system 102. The camera 302 obtains still and/or video image data representing the front end 310 of the vehicle 104 and the area of the route 108 in front of the vehicle system 102. The vehicle system 102 also includes a second, rear-facing camera 312 mounted to the rear-most non-propulsion-generating vehicle 106, and configured to obtain still and/or video image data representing the area of the route 108 behind the vehicle system 102 along the direction of travel 304. The cameras 302, 312 transmit the image data as status signals to the safety mode activation device 140. The safety mode activation device 140 may perform image analysis on the image data to determine the presence or absence of an operator and/or an active work marker 142 within the respective fields of view 308 of the cameras 302, 312. Upon detection of an operator or active work marker 142 within a certain designated proximity of the vehicle system 102, such as 5 m, 10 m, 30 m, 50 m, or the like, the activation device 140 may transmit the lockout signal to the controller 202, activating the safety mode. In an alternative embodiment, the cameras 302, 312 or a processing device associated with the cameras 302, 312 analyze the image data to determine the presence or absence of an operator or an active work marker 142, and send the status signal to the activation device 140 in response to confirming such a presence of an operator or an active work marker.

In the illustrated embodiment, the front-facing camera 302 obtains image data that includes two different active work markers 142, with one active work marker 142A on the front of the propulsion-generating vehicle 104 and the other marker 142B along the route 142. Upon detection of the markers 142A, 142B using the image data transmitted as a status signal, the activation device 140 transmits the lockout signal to the controller 202 to automatically initiate the safety mode of the vehicle system 102. In addition, the activation device 140 and/or the controller 202 may communicate the safety mode status of the vehicle system 102 remotely to the remote control system 112 (shown in FIG. 2) using the communication device 208 to notify the operator at the remote control system 112 that the vehicle system 102 is in the safety mode and currently prevented from moving. The markers 142A, 142B may be blue flags, ID cards, signs, or other objects. For example, the marker 142A on the vehicle 104 may be a flag placed on the vehicle 104 by an operator that is going to perform some work on the vehicle system 102. The marker 142B along the route 108 may indicate that a segment of the route 108 ahead of the vehicle system 102 is being worked on, such as inspected or repaired. Therefore, the vehicle system 102 should be placed in the safety mode to avoid entering the flagged segment of the route 108. Although the markers 142A, 142B may be visible to other operators proximate to the vehicle system 102, the activation device 140 and/or the controller 202 uses the communication device 208 to notify the remote operator located beyond the line of sight of the markers 142A, 142B.

In the illustrated embodiment, the vehicle system 102 also includes RFID readers 314 mounted to the vehicles 104, 106. The RFID readers 314 are configured to automatically detect the presence of any RFID antennas 318 within a designated proximity distance (also referred to as designated proximity threshold) 316 of the readers 314. The multiple RFID readers 314 are set up to define a controlled detection zone 320 around the vehicle system 102. The RFID readers 314 may be active readers designed to transmit interrogation signals that receive response signals from active or passive RFID antennas 308. Alternatively, the RFID readers 314 may be passive readers designed to receive radio signals from active RFID antennas 318 within the detection zone 320. In the illustrated embodiment, the RFID readers 314 detect the presence of a first RFID antenna 318A within the detection zone 320. In response, the RFID reader(s) 314 that detect the presence of the first antenna 318A transmit a status signal to the safety mode activation device 140 indicating the presence of the RFID antenna 318A within the detection zone 320. The first RFID antenna 318A may be carried by a first operator, such as embedded within an ID card, a mobile device, or the like. The operator may be approaching the vehicle system 102 to perform maintenance on the vehicle system 102. The RFID reader 314 may obtain various information from the first RFID antenna 318A, such as an identification of the operator by name, employee ID number, assigned task to perform on the vehicle system 102, or the like. Some or all of this information obtained from the RFID antenna 318A may be transmitted to the safety mode activation device 140 as a status signal. Upon receiving the status signals from the RFID reader 314 that indicate the presence of the specific operator, the activation device 140 may automatically transmit the lockout signal to the controller 202 to initiate the safety mode. The status signals sent to the activation device 140 may include additional information, such as information identifying the specific RFID reader or readers 314 that detected the antenna 318A, the location that the antenna 318A was detected relative to the vehicle system 102, or the like. Optionally, the active work markers 142 may also include RFID antennas that can be detected by the RFID readers 314 of the vehicle system 102 when the markers 142 are within the designated detection zone 320.

The RFID readers 314 are also able to detect the absence of the RFID antenna within the detection zone 308. For example, the RFID readers 314 can detect when the operator carrying the first RFID antenna 318A exits the detection zone 308 such that the operator is located beyond the designated proximity distance 316 from the vehicle system 102. The RFID readers 314 may transmit a status signal to the safety mode activation device 140 that indicates that the operator carrying the antenna 318A has moved beyond the proximity distance 316. In response to receiving such a status signal, the activation device 140 may transmit a release signal to the controller 202 which deactivates the safety mode, permitting controlled movement of the vehicle system 102 along the route 108. As shown in FIG. 3, a second RFID antenna 318B on another operator is outside of the detection zone 320 and is not detected by the RFID readers 314. The operator carrying the second RFID antenna 318B is far enough away from the vehicle system 102 that the operator is not at risk of harm from the vehicle system 102. Therefore, when the activation device 140 determines, based on the status signals received from the RFID readers 314, that both antennas 318A, 318B are outside of the detection zone 308, the vehicle system 102 can be permitted to move along the route 108 without risk of harm to the operators (assuming that any other persons or active work markers 142 are also absent from the area proximate to the vehicle system 102).

The detection sensors 116 are also configured to detect the presence of operators and/or markers 142 on and underneath the vehicle system 102. For example, the RFID readers 314 shown in FIG. 3 and/or motion sensors, cameras, audio sensors (e.g., microphones), radar sensors, ultrasonic sensors, infrared sensors, heat sensors, or the like may be mounted on the vehicles 104, 106 to detect operators moving underneath the vehicle system 102.

Although not shown in FIG. 3, the operators may carry mobile devices (e.g., smartphones, tablet computers, handheld personal computers, wearable computers, personal digital assistants (PDAs), and the like), that are used to determine the relative locations of the operators to the vehicle system 102. For example, the mobile devices may transmit status signals to the safety mode activation device 140 that allow the activation device 140 to determine the location of the operators carrying each mobile device. The mobile devices may communicate with the safety mode activation device 140 onboard the vehicle system 102 via establishing a communication link, such as a Bluetooth or other wireless connection, with the communication device 208. The status signals transmitted from the mobile devices may include location data, such as GPS coordinates or relative location data between the mobile device and the vehicle system 102. The location data may indicate absolute locations (e.g., in geographical coordinates) or relative locations (e.g., location of the mobile devices relative to the vehicle system 102 or vice-versa). In an embodiment, the activation device 140 is configured to analyze the location of each mobile device relative to the vehicle system 102 based on the location data received from the mobile devices. The activation device 140 transmits the lockout signal to the controller 202 responsive to determining that at least one of the mobile devices is within the designated proximity distance 316 of the vehicle system 102. In an alternative embodiment, the activation device 140 may control the transmission of location data of the vehicle system 102 to the mobile devices, and the mobile devices may determine the proximity of the respective mobile device to the vehicle system 102 based on the location data received from the activation device 140. In such embodiment, upon a mobile device carried by an operator determining that the mobile device is located within the proximity distance 316 of the vehicle system 102, the mobile device transmits a status signal to the activation device 140 indicating the presence of the operator within the proximity distance 316. The activation device 140 transmits the lockout signal upon receipt of such status signal.

Figure 4:
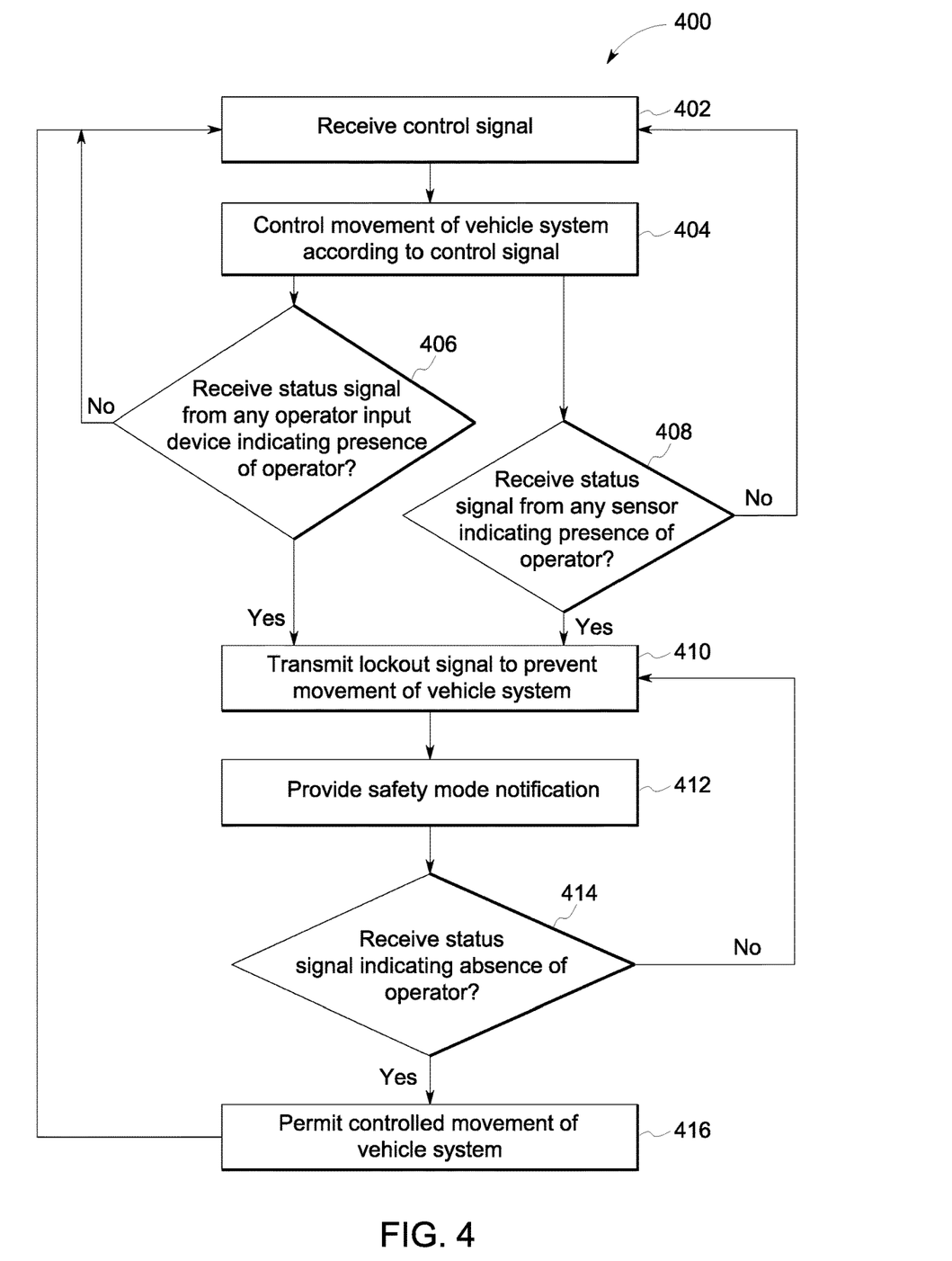
FIG. 4 illustrates a flowchart of a method for controlling a vehicle system along a route to prevent movement of the vehicle system in a safety mode according to an embodiment.

FIG. 4 illustrates a flowchart of a method 400 for controlling a vehicle system to prevent movement of the vehicle system 102 in a safety mode along a route. The method 400 may be performed using the communication system 100 shown in FIG. 1, such as using the safety mode activation device 140 and/or the controller 202 onboard the vehicle system 102. At 402, a control signal is received at the onboard vehicle control system 114 of the vehicle system 102. The control signal may be a control signal received from an operator using the remote control system 112. The control signal is received by the communication device 208 and relayed to the controller 202. Alternatively, the control signal may be received from an operator onboard the vehicle system 102 using the operator input device 212 or from the energy management system 220. At 404, the movement of the vehicle system 102 is controlled according to the control signal. For example, the controller 202 conveys the control signal, or another electrical signal based on the received control signal, to the propulsion subsystem 216. The control signal includes operational settings, such as throttle settings, brake settings, speed settings, or the like. The propulsion subsystem 216 implements the operational settings of the control signal to provide thrust and/or braking for controlling the movement of the vehicle system 102 according to the control signal.

At 406 and 408, it is determined whether or not a status signal is received that indicates the current or anticipated presence of an operator and/or an active work marker in a location within a designated proximity distance of the vehicle system 102. For example, at 406, a determination is made whether a status signal has been received from any operator input device, such as the onboard input device 212, the remote control system 112, and/or the mobile devices 144 carried by operators. An operator may use the operator input device to selectively initiate transmission of a status signal that includes a lockout command from the input device to the safety mode activation device 140. Upon receipt of the lockout command signal, the activation device 140 is configured to transmit the lockout signal to the controller 202 to initiate the safety mode.

For example, an operator that is assigned the task of performing a repair on the vehicle system 112 may use that operator's mobile device to selectively transmit the status signal. In an embodiment, the operator may use a user interface of the mobile device (or the other operator input devices 112, 212) to transmit the lockout command by providing a personal identifier that identifies the operator and also proves the operator's authorization to place the vehicle system 102 in the safety mode. The personal identifier may include a password, a name of the operator, a serial number (e.g., an employee number or social security number) of the operator, or the like that is entered using the user interface. Optionally, the personal identifier may be a biometric signal, such as a fingerprint or a retina scan. The operator input device may transmit the status signal including the lockout command to the safe mode activation device 140 at a time that the operator is prepared to perform the scheduled repair work on the vehicle system 102 or in advance of the time that the operator is going to perform the work. For example, the status signal may also include additional information such as a designated start time for the repair work, an estimated duration of the repair work, identification of the vehicle system 102, and the like. The operators may use the mobile devices and other operator input devices to transmit the status signals to the activation device 140 using network connections between the input devices and the communication device 208 of the vehicle system 102. For example, in order to transmit a signal including a lockout command, the operator may be required to log-in to a secure network or website using a password.

As described above with reference to FIG. 3, the mobile device of an operator may transmit a status signal automatically to the safety mode activation device 140 upon detecting that the operator carrying the mobile device is within a designated proximity distance of the vehicle system 102. Furthermore, the mobile devices of the operators may also periodically, or upon request, transmit status signals to the activation device 140 that include location data of the mobile devices. The activation device 140 may determine whether or not any operators carrying the mobile devices are within the designated proximity distance of the vehicle system 102 based on the location data received from the mobile devices.

If one or more of the status signals received from the operator input devices, such as the mobile devices 144, the remote control system 112, or the onboard input device 212, indicate the presence of an operator (including trespassers and other non-employee persons) in a location proximate to the vehicle system 102, the flow of the method 400 continues to 410 and a lockout signal is transmitted from the safety mode activation device 140 to the controller 202 to initiate a safe mode of the vehicle system 102 that prevents movement of the vehicle system 102. If, on the other hand, the status signals received (or the lack thereof) indicate no operators within a designated proximity threshold of the vehicle system 102, then flow of the method 400 returns to 402 to wait for the receipt of additional control signals.

Regardless of whether or not a status signal indicating the presence of an operator proximate to the vehicle system 102 is received from any operator input device, at 408 a determination is made whether or not a status signal indicating the presence of an operator or an active work marker proximate to the vehicle system 102 is received from any detection sensors 116 mounted on the vehicle system 102. For example, the detection sensors 116 may include one or more of a camera, an RFID reader, a motion-activated proximity sensor, an audio sensor (e.g., microphone), a radar sensor, an ultrasonic sensor, a thermal imaging camera, or the like. The detection sensors 116 transmit status signals that include sensor data (e.g., image data, RFID data, audio data, etc.) to the safety mode activation device 140. The safety mode activation device 140 analyzes the sensor data to determine whether or not the sensor data received indicates the presence of any operators, other people, or active work markers within a certain area surrounding the vehicle system 102, including underneath and on the vehicle system 102. As with step 406 above, if any of the status signals received from the sensors indicate the presence of an operator or an active work marker in a location proximate to the vehicle system 102, the flow of the method 400 continues to 410 and a lockout signal is transmitted from the safety mode activation device 140 to the controller 202 to initiate a safe mode of the vehicle system 102 that prevents movement of the vehicle system 102. If, on the other hand, the status signals received indicate no operators or active work markers within a designated proximity threshold of the vehicle system 102, then flow of the method 400 returns to 402 to wait for the receipt of additional control signals.

At 410, the activation device 140 transmits a lockout signal to the controller 202 to initiate the safe mode. In response to receiving the lockout signal, the controller 202 may prevent movement of the vehicle system 102 by automatically engaging a brake of the vehicle system 102 and preventing the brake from disengaging while the vehicle system 102 is in the safe mode. The controller 202 also may prevent movement of the vehicle system 102 by disregarding (e.g., delaying implementation of) any control signals received while the vehicle system 102 is in the safety mode. The controller 202 may disregard remote control signals received from the remote control system 112 and onboard control signals received from the onboard operator input device 212 or the energy management system 220. For example, if a received control signal dictates controlling the propulsion subsystem 216 at a throttle setting of 4 and release of the brakes to propel the vehicle system 102 along the route 108, the controller 202 does not convey that control signal to the propulsion subsystem 216. As a result, the propulsion subsystem 216 does not release the brakes and does not implement the dictated throttle setting. Optionally, the activation device 140 and/or the controller 202 may take additional actions including preventing an engine of the vehicle system 102 from starting, causing the engine to slow down or shut off, or preventing the engine from increasing the operating speed while in the safe mode. In one embodiment, after transmitting the lockout signal to the controller 202 such that the controller 202 controls the propulsion subsystem 216 to engage the brake, the activation device 140 may be configured to activate the electrical switch 222 along the electrically conductive circuit 218 between the controller 202 and the propulsion subsystem 216 to electrically disconnect the propulsion subsystem 216 from the controller 202. Therefore, the controller 202 is not able to convey any control signals to the propulsion subsystem 216 while the switch 222 is activated in the open state.

At 412, a safety mode notification is provided to communicate to operators, remote and/or local, that the vehicle system 102 is in the safety mode. For example, the activation device 140 and/or the controller 202 may communicate a status signal to the remote control system 112 using the communication device 208, and the remote control system 112 may generate a safety mode notification on a display screen to notify the remote operator that the vehicle system 102 is in the safety mode. The safety mode notification may be a blue screen, a text-based message on the display, or the like. The activation device 140 and/or the controller 202 may also provide a safety mode notification for operators proximate to the vehicle system 102 by communicating a notification message to the mobile devices carried by the operators. The notification message may cause a blue-colored graphic or text-based message indicating the safety mode to be displayed on the screens of the mobile devices. The activation device 140 and/or the controller 202 may also use the vehicle system 102 to provide the safety mode notification. For example, the activation device 140 and/or the controller 202 may generate a designated lighting effect using one or more lights of the vehicle system 102 and/or a designated sound effect using one or more audio emitters (e.g., speakers) of the vehicle system 102. The designated lighting effect may include generating a blue-colored light in the cab and/or around the outside of the vehicle system 102. The designated sound effect may be a designated beeping sound, a designated voice recording, or the like. The presence of the safety mode notification alerts operators that the vehicle system 102 is in the safety mode, and the absence of the safety mode notification may alert operators that the vehicle system 102 is not in the safety mode. Therefore, if any operator in a vulnerable position relative to the vehicle system 102 notices that the safety mode notification has ceased or not yet started, that operator should exercise caution and move immediately to a safe position.

At 414, it is determined whether a status signal indicating an absence of all operators and/or active work markers from the area proximate to the vehicle system 102 is received at the safety mode activation device 140. The status signal indicating such absence may be received from a sensor, such as a sensor that previously detected the presence of an operator proximate to the vehicle system. The status signal indicating such absence may also be received from an operator input device, such that an operator may use a personal mobile device to transmit a status signal to the activation device 140 indicating that the operator is no longer proximate to the vehicle system 102. In an embodiment, the activation device 140 does not transmit a release signal to the controller 202 to deactivate the safety mode until the activation device 140 confirms that no operators or active work markers are proximate to the vehicle system 102. Thus, if four operators were working on the vehicle system 102, the activation device 140 does not transmit the release signal until all four operators have been confirmed to be outside of the designated proximity threshold of the vehicle system 102.

If it is determined that status signals indicating an absence of all operators and/or active work markers from the area proximate to the vehicle system 102 have not been received, then the method 400 returns to 410 and the vehicle system 102 is still maintained in the safety mode and prevented from moving. If, on the other hand, the activation device 140 determines that no operators or active work markers are proximate to the vehicle system 102, then flow of the method 400 continues to 416.

At 416, the safety mode activation device 140 transmits a release signal to the controller 202 to deactivate the safety mode and permit controlled movement of the vehicle system 102 along the route 108. The sending of the release signal does not automatically disengage the brakes, which could result in a runaway vehicle system 102, but instead permits the vehicle system 102 to be controlled by control signals. For example, the activation device 140 may deactivate the electrical switch 222 to close the conductive path between the controller 202 and the propulsion subsystem 216 along the electrically conductive circuit 218. In addition, the controller 202 may convey the control signals received during and after the time period that the vehicle system 102 is in the safety mode to the propulsion subsystem 216. The controller 202 permits controlled movement dictated by control signals received from the remote control system 112, the onboard input device 212, and/or the energy management system 220, but does not permit uncontrolled movement of the vehicle system 102. After 416, the method 400 may return to 402 for receiving additional control signals to control movement of the vehicle system 102 along the route 108.

In an embodiment, a system (e.g., for implementing a safety procedure) is provided that includes a safety mode activation device disposed onboard a vehicle system and operatively connected to a controller of the vehicle system. The safety mode activation device is configured to receive a status signal indicating a presence of one or more of an operator or an active work marker in a location proximate to the vehicle system. The safety mode activation device is further configured to transmit a lockout signal to the controller to prevent movement of the vehicle system along a route responsive to receiving the status signal.

Optionally, the transmission of the lockout signal prevents the movement of the vehicle system by automatically engaging a brake of the vehicle system and preventing the brake from disengaging.

Optionally, the transmission of the lockout signal is further configured to prevent one or more of energizing a power bus in the vehicle system, starting an engine of the vehicle system, or increasing a speed of the engine of the vehicle system.

Optionally, the transmission of the lockout signal prevents the movement of the vehicle system by not implementing control signals that include operational settings for controlling one or more of tractive efforts and braking efforts of the vehicle system. The control signals may be received from one or more of an operator input device onboard the vehicle system or a remote control system disposed off-board the vehicle system.

Optionally, the safety mode activation device receives the status signal from a mobile device carried by the operator. Optionally, the safety mode activation device may receive the status signal from the mobile device responsive to the mobile device determining that the mobile device is located within a designated proximity distance of the vehicle system. Optionally, the safety mode activation device may be configured to determine a location of the operator based on the status signal received from the mobile device carried by the operator, and the safety mode activation device may transmit the lockout signal to the controller responsive to determining that the location of the operator is within a designated proximity distance of the vehicle system.

Optionally, the safety mode activation device receives the status signal from a detection sensor mounted on the vehicle system and transmits the lockout signal to the controller responsive to determining that the one or more of the operator or the active work marker is located within a detection proximity threshold of the detection sensor. Optionally, the detection sensor is an RFID reader that detects the presence of an RFID antenna located on the one or more of the operator or the active work marker responsive to the RFID antenna being within the detection proximity threshold of the RFID reader.

Optionally, the status signal received by the safety mode activation device includes image data indicative of an area outside of the vehicle system captured by a camera disposed on the vehicle system. The safety mode activation device is configured to transmit the lockout signal to the controller responsive to determining the presence of the one or more of the operator or the active work marker in the area outside of the vehicle system based on the image data.

Optionally, the status signal received by the safety mode activation device is a long range wireless signal transmitted from a remote control system that is off-board the vehicle system for remotely controlling the movement of the vehicle system.

Optionally, the safety mode activation device is further configured to transmit a release signal subsequent to transmitting the lockout signal. The release signal is transmitted to the controller to allow movement of the vehicle system responsive to receiving the release signal.

Optionally, responsive to receiving the status signal, the safety mode activation device is further configured to one or more of control a light on the vehicle system to generate a designated lighting effect or control an audio emitter on the vehicle system to generate a designated sound effect.

Optionally, an electrical switch is electrically connected between the controller and a propulsion subsystem of the vehicle system along an electrically conductive circuit that is used by the controller to control operation of the propulsion subsystem. The propulsion subsystem provides tractive effort for moving the vehicle system. Responsive to receiving the status signal, the safety mode activation device is further configured to activate the electrical switch to electrically disconnect the propulsion subsystem from the controller to prevent the controller from controlling the operation of the propulsion subsystem.

Optionally, the safety mode activation device receives the status signal from an operator input device in response to an operator using the operator input device to selectively initiate transmission of the status signal by providing a personal identifier to the operator input device.

In another embodiment, a method (e.g., for implementing a safety procedure) is provided that includes receiving, by a safety mode activation device onboard a vehicle system and operatively connected to a controller of the vehicle system, a status signal that indicates a presence of at least one of an operator or an active work marker in a location proximate to the vehicle system. The method also includes transmitting a lockout signal to the controller to automatically prevent movement of the vehicle system along a route responsive to receiving the status signal.

Optionally, the method further includes receiving control signals that include operational settings for controlling one or more of tractive efforts and braking efforts of the vehicle system. The control signals are received from one or more of an operator input device onboard the vehicle system or a remote control system disposed off-board the vehicle system. Transmitting the lockout signal to the controller prevents movement of the vehicle system by not implementing the control signals that are received after transmitting the lockout signal.

Optionally, the status signal is received from a detection sensor mounted on the vehicle system. The lockout signal is transmitted to the controller responsive to determining that the one or more of the operator or the active work marker is located within a detection proximity threshold of the detection sensor.

Optionally, the method further includes transmitting a release signal to the controller subsequent to transmitting the lockout signal. The release signal is transmitted to permit controlled movement of the vehicle system along the route responsive to the safety mode activation device receiving an updated status signal indicating an absence of the at least one of the operator or the active work marker in the location proximate to the vehicle system.

Optionally, the vehicle system includes a light and an audio emitter. The method further includes one or more of automatically controlling the light to generate a designated lighting effect or automatically controlling the audio emitter to generate a designated sound effect responsive to receiving the status signal.

Optionally, transmitting the lockout signal to the controller further prevents one or more of energizing a power bus in the vehicle system, starting an engine of the vehicle system, or increasing a speed of the engine of the vehicle system.

Optionally, the status signal is received from a mobile device carried by the operator. The method further includes determining a location of the operator based on the status signal received from the mobile device. The lockout signal is transmitted to the controller responsive to determining that the location of the operator is within a designated proximity distance of the vehicle system.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, communication device, control system, etc.) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
a controller configured to control movement of a first vehicle system absent an operator input onboard the first vehicle system, the controller configured to control the movement of the first vehicle system by controlling a propulsion system of the first vehicle system and a braking system of the first vehicle system, the controller configured to be positioned off-board the first vehicle system;
an activation device configured to receive a status signal indicating a presence of a work marker proximate to the first vehicle system; and
a communication device configured to be operatively coupled with the controller and the activation device, the communication device configured to communicate a lockout signal from the activation device to the controller, the lockout signal directing the controller to prevent activation of the propulsion system and engage the braking system to prevent movement of the first vehicle system.

2. The system of claim 1, wherein the communication device is configured to communicate the lockout signal to a second vehicle system.

3. The system of claim 1, wherein the communication device is configured to communicate the lockout signal to the controller to direct the first vehicle system to automatically engage a brake of the first vehicle system.

4. The system of claim 1, wherein the communication device is configured to communicate the lockout signal to direct the first vehicle system to prevent activation of an engine of the first vehicle system.

5. The system of claim 1, wherein the communication device is configured to communicate the lockout signal to direct the first vehicle system to prevent an increase of a speed of an engine of the first vehicle system.

6. The system of claim 1, wherein the communication device is configured to communicate the lockout signal to the controller to direct the first vehicle system to prevent energizing a bus in the first vehicle system.

7. The system of claim 1, wherein the activation device is configured to receive the status signal from a mobile device.

8. The system of claim 7, wherein the activation device is configured to receive the status signal from the mobile device responsive to the mobile device being located within a designated proximity distance of the first vehicle system.

9. The system of claim 1, further comprising:
a radio frequency identification (RFID) reader configured to detect a presence of an RFID antenna within a detection distance of the RFID reader, the RFID reader configured to communicate the status signal to the activation device via the communication device responsive to the presence of the RFID antenna within the detection distance of the RFID reader.

10. The system of claim 1, wherein the activation device is configured to receive image data as the status signal, the image data representing an area outside of the first vehicle system, the communication device configured to communicate the lockout signal to the controller responsive to determining the presence of the work marker in the area outside of the first vehicle system based on the image data.

11. The system of claim 1, wherein the controller is configured to activate lights of the first vehicle system responsive to receiving the lockout signal.

12. The system of claim 1, wherein the communication device is configured to communicate a release signal to the controller subsequent to communicating the lockout signal to direct the first vehicle system to permit movement of the first vehicle system.

13. The system of claim 1, wherein the activation device is configured to disconnect the propulsion system from the controller responsive to receiving the status signal.

14. A method comprising:
receiving a status signal at an activation device of a first vehicle system, the status signal indicating a presence of a work marker proximate to the first vehicle system;
communicating a lockout signal to a controller positioned off-board the first vehicle system that directs the first vehicle system to prevent movement of the first vehicle system; and
communicating the lockout signal to a second vehicle system.

15. The method of claim 14, wherein the lockout signal is communicated to direct the controller to one or more of:
automatically engage a brake of the first vehicle system;
prevent energizing a bus in the first vehicle system;
prevent activation of an engine of the first vehicle system;
prevent an increase of a speed of the engine of the first vehicle system; or
disregard a control signal received from one or more of an operator input device onboard the first vehicle system or a remote control system disposed off-board the first vehicle system.

16. A device comprising:
one or more controllers configured to control a propulsion system of a first vehicle system and a braking system of the first vehicle system, the one or more controllers configured to be positioned off-board the first vehicle system; and
one or more processors configured to determine whether a location of a person outside of the first vehicle system is within a threshold distance of the first vehicle system, the one or more processors configured to implement a safety mode of the first vehicle system that prevents movement of the first vehicle system responsive to determining that the location of the person is within the threshold distance of the first vehicle system,
wherein movement of the first vehicle system is controlled absent an operator input onboard the first vehicle system, and
wherein the safety mode is communicated to a second vehicle system.

17. The device of claim 16, wherein the one or more processors are configured to implement the safety mode of the first vehicle system by directing the one or more controllers to one or more of:
automatically engage a brake of the first vehicle system;
prevent energizing a bus in the first vehicle system;
prevent activation of an engine of the first vehicle system;
prevent an increase of a speed of the engine of the first vehicle system; or
direct the one or more controllers to disregard a control signal received from a control system disposed on-board the first vehicle system.

18. The device of claim 16, wherein the one or more processors are configured to determine whether the location is within the threshold distance of the first vehicle system based on output from a radio frequency identification (RFID) reader.

19. The device of claim 16, wherein the one or more processors are configured to examine image data to determine whether the location of within the threshold distance of the first vehicle system.

20. The device of claim 16, wherein the one or more processors are configured to disconnect a vehicle propulsion subsystem from the one or more controllers responsive to determining that the location is within the threshold distance of the first vehicle system.

\* \* \* \* \*